United States Patent
Ohno

(10) Patent No.: US 7,530,723 B2
(45) Date of Patent: May 12, 2009

(54) SPREAD ILLUMINATING APPARATUS

(75) Inventor: Yasuo Ohno, Kitasaku-gun (JP)

(73) Assignee: Minebea Co., Ltd., Nagano (JP)

(*) Notice: Subject to any disclaimer, the term of this patent is extended or adjusted under 35 U.S.C. 154(b) by 0 days.

(21) Appl. No.: 12/000,260

(22) Filed: Dec. 11, 2007

(65) Prior Publication Data
US 2008/0170412 A1 Jul. 17, 2008

(30) Foreign Application Priority Data
Jan. 12, 2007 (JP) ............... 2007-004660

(51) Int. Cl.
F21V 8/00 (2006.01)
(52) U.S. Cl. ............... 362/613; 362/612; 362/623; 362/625
(58) Field of Classification Search .......... 362/612, 362/613, 623, 624, 625
See application file for complete search history.

(56) References Cited

U.S. PATENT DOCUMENTS 6,435,686 B1 * 8/2002 Gotou et al. ............... 362/623
7,350,951 B2 * 4/2008 Sakai et al. ............... 362/555

FOREIGN PATENT DOCUMENTS

| JP | A 10-161119 | 6/1998 |
| JP | A 2001-084822 | 3/2001 |
| JP | A 2003-242817 | 8/2003 |
| JP | A 2005-108817 | 4/2005 |
| JP | A 2006-184350 | 7/2006 |

* cited by examiner

Primary Examiner—Laura Tso
(74) Attorney, Agent, or Firm—Oliff & Berridge, PLC

(57) ABSTRACT

A spread illuminating apparatus includes LEDs as point light sources fixedly mounted on a flexible printed circuit, a light conductor plate having a light inlet surface, a light reflector plate disposed under the light conductor plate, a light absorbing member constituted by a black tape, and a sheet metal case having walls on all four sides and housing the component members described above. An end of the light reflector plate located toward the LEDs is positioned beyond the light inlet surface of the light conductor plate, and recesses are provided at the end of the light reflector plate. A black tape as a light absorbing member is disposed on the outer surface of the light reflector plate along the light inlet surface, and a light absorbing region is formed such that the black tape is exposed through the recess.

4 Claims, 6 Drawing Sheets

F I G. 4
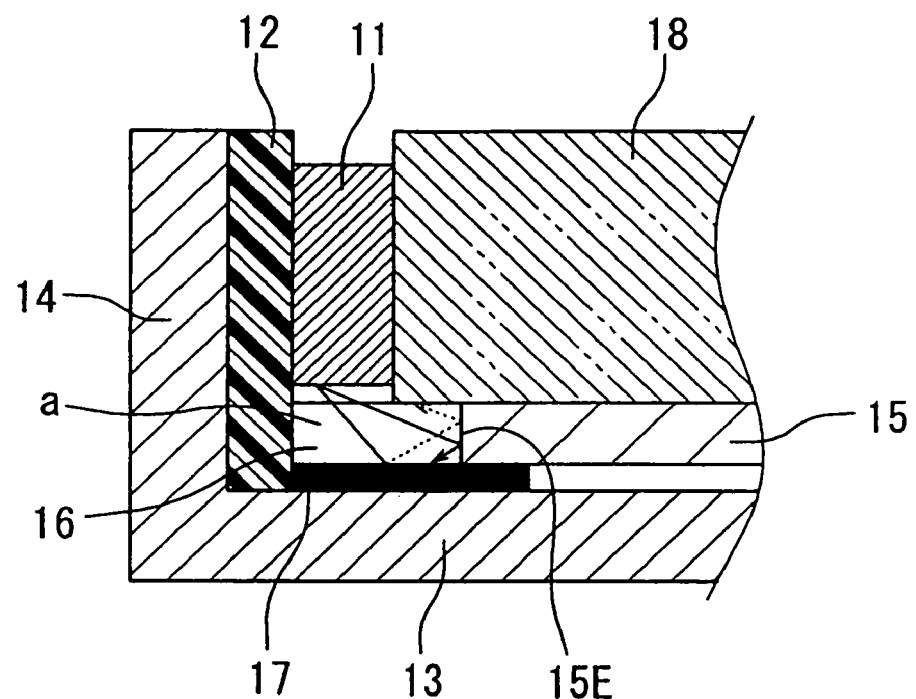
F I G. 5
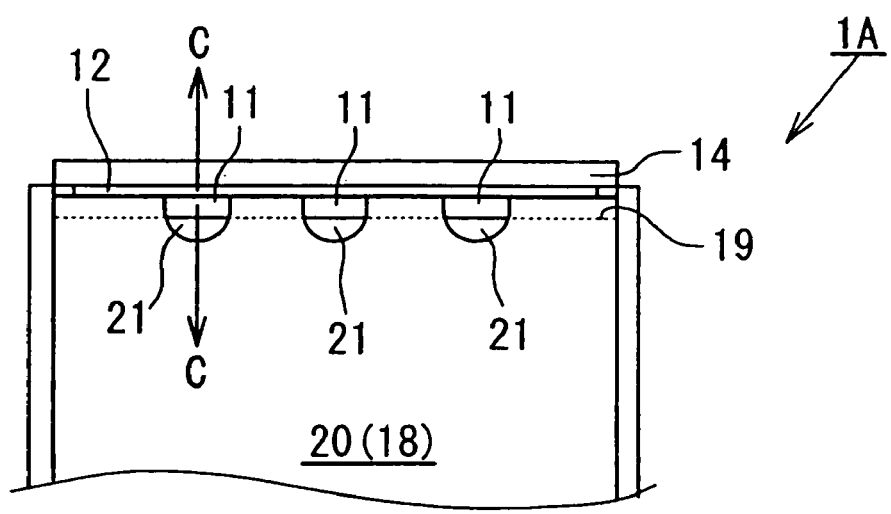

SPREAD ILLUMINATING APPARATUS

BACKGROUND OF THE INVENTION

1. Field of the Invention

The present invention relates to a side light type spread illuminating apparatus, and more particularly to a spread illuminating apparatus which is used as a lighting means of a liquid crystal display device and in which a hot spot attributable to light coming from a light emitting diode as a light source is inhibited.

2. Description of the Related Art

A backlight system which irradiates a liquid crystal display (LCD) area from its behind has been conventionally used as a spread illuminating apparatus (a lighting means) for an LCD device. Such the spread illuminating apparatus (backlight system) includes a light conductor plate having light transmitting property, and a plurality of light emitting diodes (LEDs) or a cold cathode lamp as a light source disposed at a side surface of the light conductor plate, wherein light, which is emitted from the LED or the cold cathode lamp and introduced into the light conductor plate through the side surface (light inlet surface), exits from a light outlet surface of the light conductor plate while traveling inside the light conductor plate with repeated reflection and diffusion therein. In order to allow the light introduced in the light conductor plate to efficiently exit from the light outlet surface, a light reflector plate is provided at a major surface of the light conductor plate opposite to the light outlet surface.

The spread illuminating apparatus structured as described above, however, fails to achieve a favorable display quality, and a spread illuminating apparatus is disclosed as shown in FIG. 7 which, in order to prevent emission lines from occurring at the LCD area and brightness from lowering, is structured to include at a light outlet surface of a light conductor plate 104 a light absorber layer 108 disposed along a light source lamp 102 having a reflector 103 disposed at its behind and sandwiched between a light diffuser sheet 105 and a light reflector lay 109, and also to include another light absorber layer 108 which is printed on a major surface of the light conductor plate 104 opposite to the light outlet surface, is disposed along the light source lamp 102 and which is covered by a light reflector sheet 107, wherein light emitted from the light source lamp 102 is adapted to pass through a prism sheet 106 disposed on the light diffuser sheet 105 when exiting the light conductor plate 104 (refer to, for example, Japanese Patent Application Laid-Open No. H10-161119: Paragraphs 0020 to 0025, FIG. 1).

Also, the above-described spread illuminating apparatus, when incorporating LEDs as a light source, causes a non-uniform brightness that occurs on the light outlet surface of the light conductor plate between the area in front of each LED (high brightness) and the other area (low brightness), for example, the area between two adjacent LEDs. FIG. 8 shows a relevant portion of a spread illuminating apparatus which, in order to prevent such the non-uniform brightness defect, includes a light reflecting and absorbing sheet 7 disposed along a light inlet surface of a light conductor plate 2 so as to cover LEDs 5 mounted on a printed board 6, and also includes a light absorbing surface 8 formed on the inner side of the light reflecting and absorbing sheet 7 thus covering the LEDs 5. In the spread illuminating apparatus shown in FIG. 8, lights L1 and L2 out of lights emitted from the lowest part of the LED 5 and entering the light conductor plate 2 from the light inlet surface fall incident on a light outlet surface of the light conductor plate 2 at a critical angle θ or a smaller angle and are absorbed at the light absorbing surface 8 formed at the inner side of the light reflecting and absorbing sheet 7 while a light L3 thereof falls incident on the light outlet surface of the light conductor plate 2 at an angle larger than the critical angle θ and is fully reflected at the light outlet surface. Thus, lights direct from the LED 5 are prohibited from exiting from an area located in front of the LED 5 on the light outlet surface of the light conductor plate 2, whereby brightness non-uniformity at the light outlet surface attributable to a high brightness provided at the area in front of the LED 5 can be reduced or removed (refer to, for example, Japanese Patent Application Laid-Open No. 2003-242817: Paragraphs 0045 to 0047, FIG. 3).

In the spread illuminating apparatus of FIG. 7 disclosed in the aforementioned Japanese Patent Application Laid-Open No. H10-161119, the brightness at the display portion is enhanced by providing a light absorber layer at each of the both major surfaces of the light conductor plate. And, in the spread illuminating apparatus of FIG. 8 disclosed in the aforementioned Japanese Patent Application Laid-Open No. 2003-242817, a light absorbing region is provided to cover above and in front of an LED so that light emitted in front of the LED is absorbed thereby lowering the brightness in front of the LED (high brightness) thus achieving a brightness uniformity.

Recently, in the spread illuminating apparatuses, a demand for expansion of effective illumination area is more and more increased, and accordingly it is needed to take further steps to inhibit brightness non-uniformity (hot spot) in the area in front of an LED. On the other hand, a light reflector plate may be extended to cover below an LED in order to effectively utilize light emitted downward from the LED, but this can possibly cause a hot spot problem.

SUMMARY OF THE INVENTION

The present invention has been made in light of the circumstances described above, and it is an object of the present invention to provide a spread illuminating apparatus in which a hot spot is inhibited from occurring, whereby a bright area in front of an LED is eliminated thus preventing brightness non-uniformity.

In order to achieve the object described above, according to an aspect of the present invention, a spread illuminating apparatus includes: a light conductor plate having a light inlet surface and a light outlet surface; at least one point light source disposed along the light inlet surface of the light conductor plate; and a light reflector plate disposed on a major surface of the light conductor plate opposite to the light outlet surface, wherein an end of the light reflector plate located toward the point light source is positioned beyond the light inlet surface of the light conductor plate, and a light absorbing region is provided so as to be located corresponding to the point light source.

In the aspect of the present invention, the light reflector plate may include a recess, and the light absorbing region may be constituted such that a light absorbing member disposed on the outer surface of the light reflector plate along the light inlet surface of the light conductor plate is exposed through the recess of the light reflector plate.

Also, in the aspect of the present invention, the recess of the light reflector plate may have a substantially semicircular shape.

Further, in the aspect of the present invention, the spread illuminating apparatus may further includes a light diffuser sheet disposed on the light outlet surface of the light conductor plate, and an end of the light diffuser sheet located toward the point light source may be positioned beyond the light inlet surface of the light conductor plate.

And, in the aspect of the present invention, the light diffuser sheet may include a recess located corresponding to the point light source, and the crown of the recess may be positioned at the light outlet surface of the light conductor plate.

Accordingly, in the spread illuminating apparatus according to the present invention, light emitted from the point light source can be efficiently utilized thereby enhancing the overall brightness across the light outlet surface, and at the same time the occurrence of a hot spot is inhibited thus improving the visual quality at the light inlet surface of the light conductor plate.

BRIEF DESCRIPTION OF THE DRAWINGS

FIG. 4 is an explanatory view of optical paths of lights emitted from an LED and impinging on a light absorbing region (recess) of a light reflector plate of the spread illuminating apparatus of FIG. 1A;

FIG. 5 is a schematic top plan view of a spread illuminating apparatus according to a second embodiment of the present invention;

DETAILED DESCRIPTION OF THE INVENTION

Exemplary embodiments of the present invention will hereinafter be described with reference to the accompanying drawings.

Figure 1A:
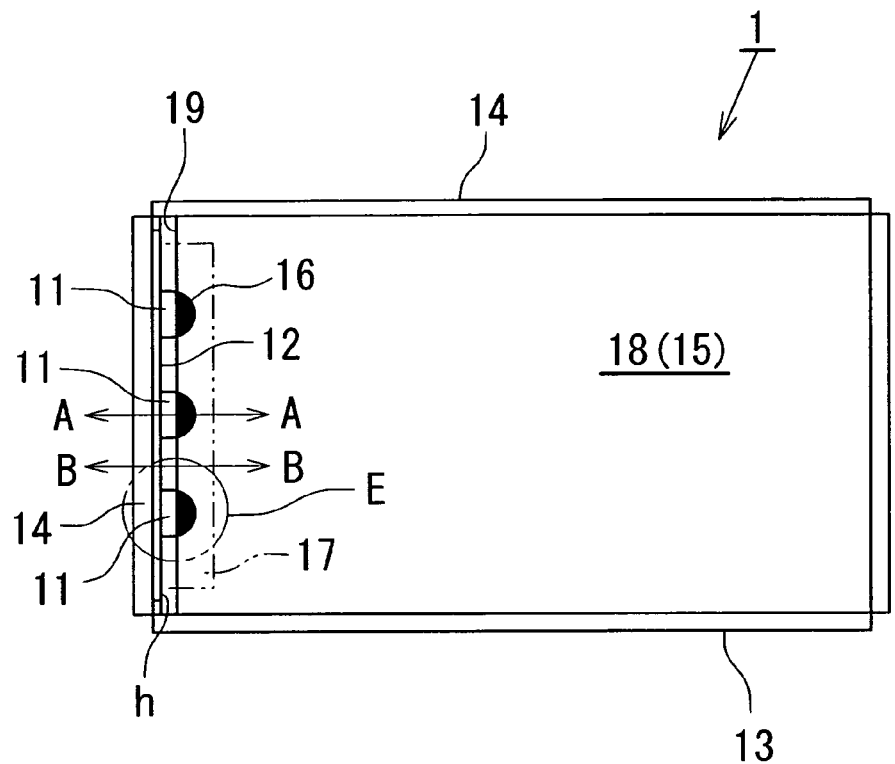
FIG. 1A is a schematic top plan view of a spread illuminating apparatus according to a first embodiment of the present invention.
Figure 1B:
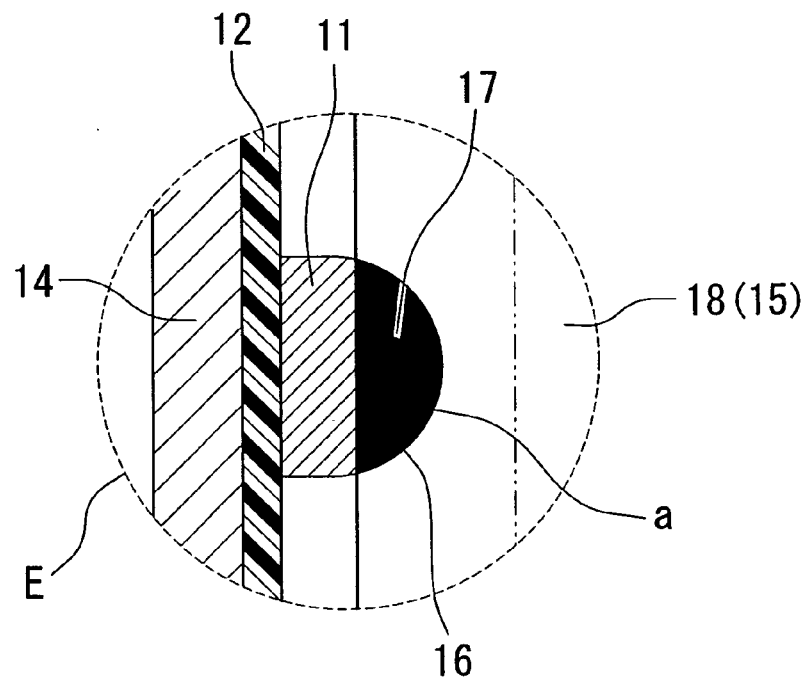
FIG. 1B is an enlarged view of a portion E shown in FIG. 1A.
Figure 2:
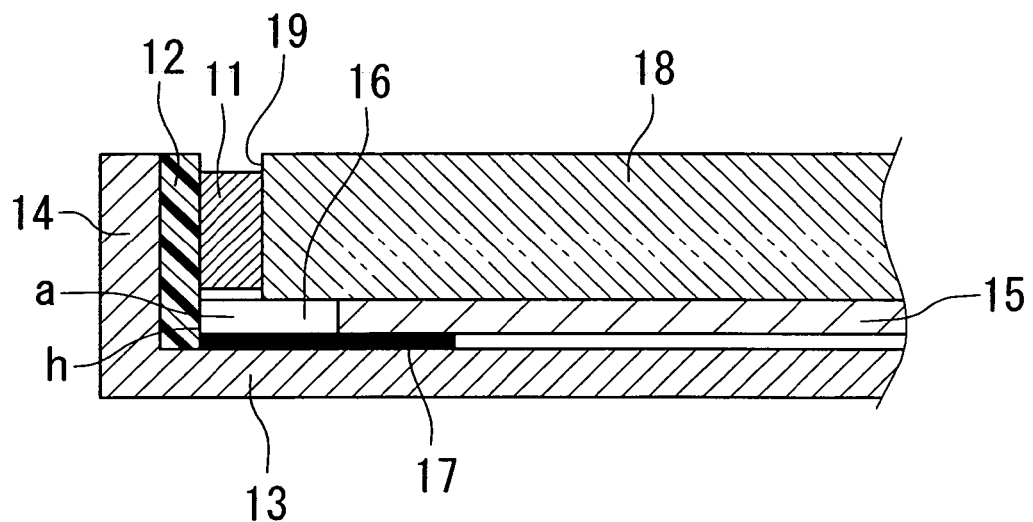
FIG. 2 is a cross sectional view of a relevant portion of the spread illuminating apparatus of FIG. 1A, taken along a line A-A.
Figure 3:
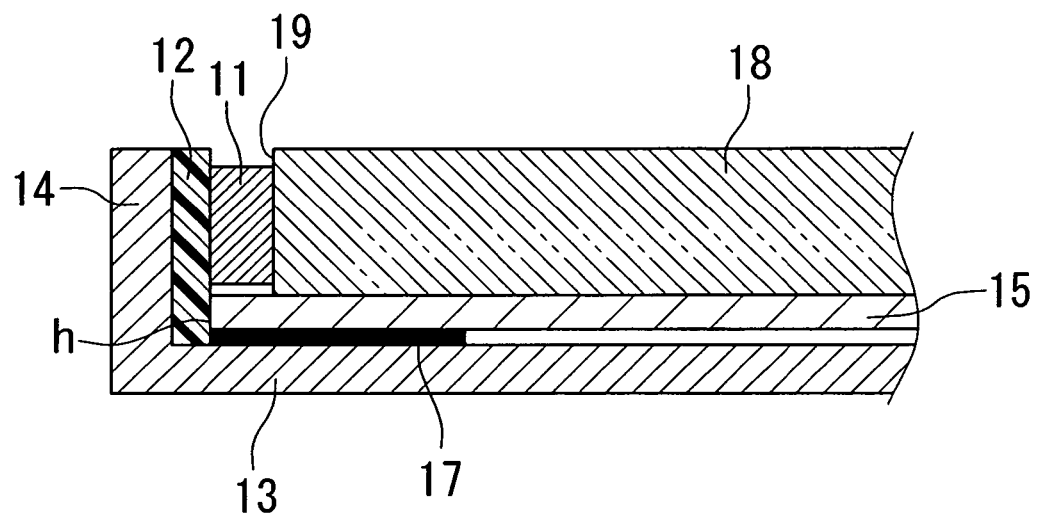
FIG. 3 is a cross sectional view of a relevant portion of the spread illuminating apparatus of FIG. 1A, taken along a line B-B.

Referring to FIGS. 1A and 1B, a spread illuminating apparatus 1 according to a first embodiment of the present invention includes LEDs 11 as point light sources fixedly mounted on a flexible printed circuit (FPC) 12, a light conductor plate 18 having a light inlet surface 19, a light reflector plate 15 disposed under the light conductor plate 18, a light absorbing member 17, and a sheet metal case 13 having walls 14 on all four sides and adapted to house the component members described above. Referring also to FIGS. 2 and 3, the FPC 12 having the LEDs 11 mounted thereon is fixedly supported by one wall 14 of the sheet metal case 13, the light reflector plate 15 is disposed over the sheet metal case 13, and the light conductor plate 18 is disposed on the light reflector plate 15.

An end h of the light reflector plate 15 located toward the LEDs 11 is positioned beyond the light inlet surface 19 of the light conductor plate 18 (in the figures, the end h is disposed in contact with the FPC 12), and recesses 16 having a semicircular shape are provided at the end h of the light reflector plate 15 so as to correspond respectively to the LEDs 11 and to cover below and in front of the respective LEDs 11, wherein the light absorbing member 17, which is constituted by a strip-shaped black material, such as a black colored tape (having a thickness substantially equal to that of the light reflector plate 15, for example, 195 μm), is disposed between the light reflector plate 15 and the sheet metal case 13 and along the end h of the light reflector plate 15 so as to cover below the LEDs 11 and the recesses 16 (see a dotted line in FIG. 1A), whereby a portion of the light absorbing member 17 exposed through each recess 16 constitutes a light absorbing region a to cover an area below and in front of the LED 11 (refer to FIG. 1B).

When the light reflector plate 15, which has its end h extending beyond the light inlet surface 19 of the light conductor plate 18 so as to cover below the LEDs 11 and which has the recesses 16 formed at the end h, is placed over the sheet metal case 13 on which a black tape as the light absorbing member 17 is previously set, the light absorbing region a located below and in front of the LED 11 is formed by the black tape (as the light absorbing member 17) exposed through the recess 16.

Referring to FIG. 4, a light beam emitted downwardly and forwardly from the LED 11 and impinging on the light absorbing member 17 of the light absorbing region a exposed through the recess 16 is absorbed thereby, and another light beam emitted downwardly and forwardly but impinging on an end face 15E of the light reflector plate 15 at the recess 16 is reflected at the end face 15E so as to fall incident on the light absorbing member 17 and is absorbed thereby, thus the occurrence of a hot spot is inhibited. In this connection, since light is emitted from the LED 11 in a radial pattern, it is preferable for the recess 16 to have a semicircular shape. And, a part of the light beam that fails to be absorbed by the light absorbing member 17 is reflected at the end face 15E so as to have its traveling direction reversed thus contributing to inhibiting the occurrence of a hot spot, compared when a light reflecting member is disposed at the inner side of the light reflector plate 15. Also since the end h of the light reflector plate 15 can be so much extended as to make contact with the FPC 12, the brightness at the display area can be enhanced. In the meanwhile, the other area of the light reflector plate 15 than the recesses 16 duly reflects light effectively thereby contributing to enhancing the brightness.

Figure 6:
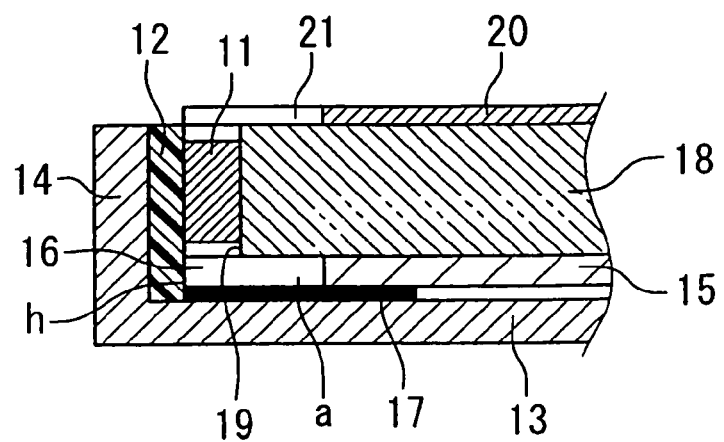
FIG. 6 is a cross sectional view of a relevant portion of the spread illuminating apparatus of FIG. 5, taken along a line C-C.
Figure 7:
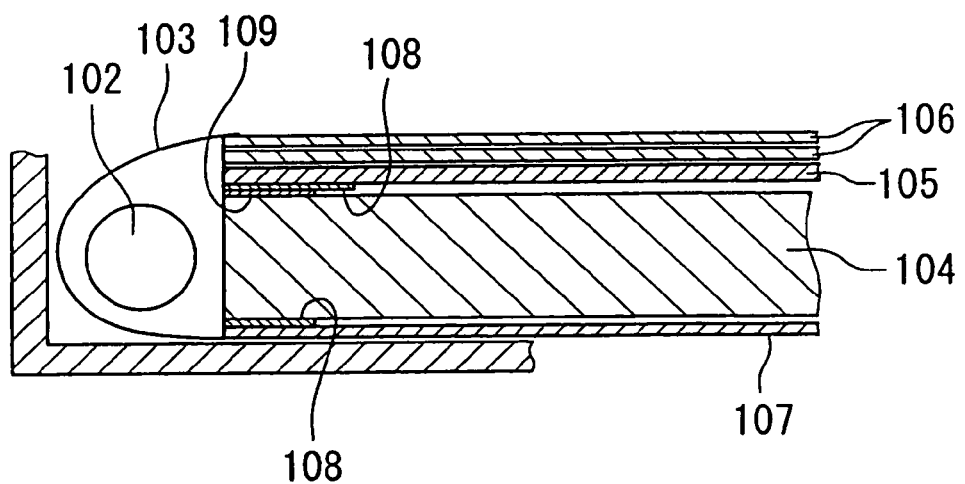
FIG. 7 is a cross sectional view of a portion of a conventional spread illuminating apparatus.
Figure 8:
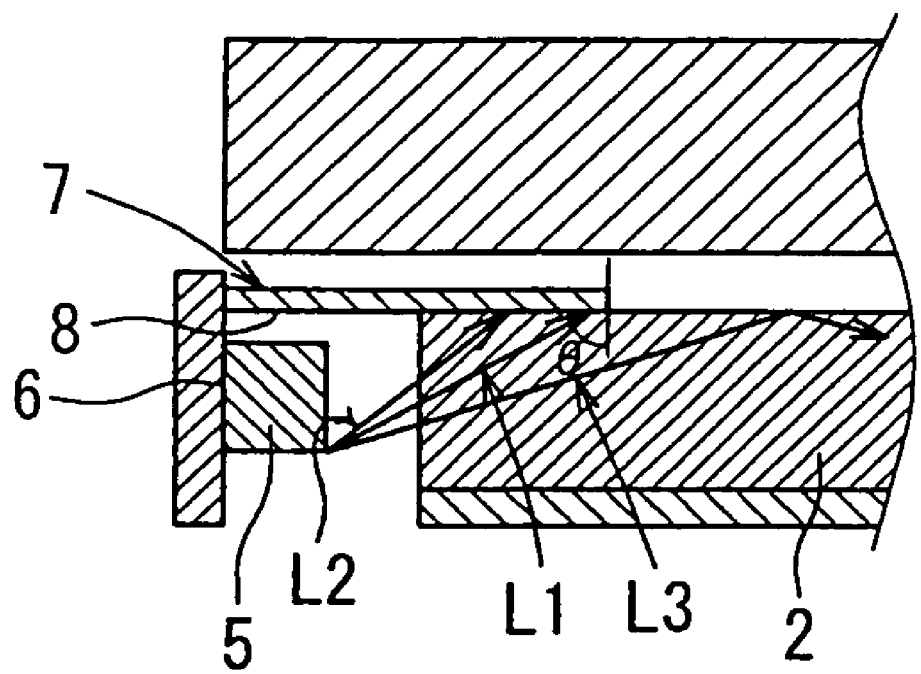
FIG. 8 is a partial cross sectional view of a portion of another conventional spread illuminating apparatus.
Figure 9:
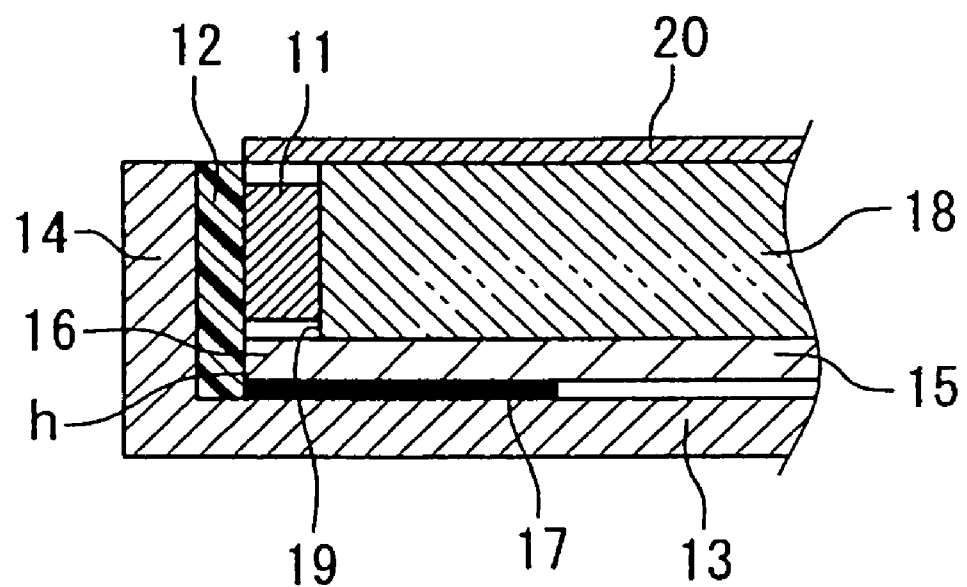
FIG. 9 is a partial cross sectional view of a portion of the spread illuminating apparatus, which shows that both ends of a light diffuser sheet and a light reflector plate extend beyond a light inlet surface toward a point light source.

A second embodiment of the present invention will now be described with reference to FIGS. 5 and 6. A spread illuminating apparatus 1A according to the second embodiment is structured basically the same as the spread illuminating apparatus 1 according to the first embodiment except the provision of a light diffuser sheet 20 on a light conductor plate 18, and a redundant description will be omitted below.

An end of the light diffuser sheet 20 located toward LEDs 11 is positioned beyond a light inlet surface 19 of the light conductor plate 18 (in the figures, the end reaches an FPC 12 on which the LEDs 11 are mounted), and recesses 21 having a semicircular shape are provided at the end of the light diffuser sheet 20 so as to correspond to respective LEDs 11 with each thereof covering above and in front of the LED 11.

With the structure described above, light beams emitted upwardly and laterally from the LED 11 are adapted to impinge on the light diffuser sheet 20 and have their optical paths changed to be effectively utilized as illumination light, and at the same time light beams emitted upwardly and forwardly from the LED 11 are adapted to impinge on a frame-like metal case (not shown) disposed on the diffuser plate 20 and exposed through the recess 21 of the diffuser sheet 20, are nearly specularly reflected at the frame-like metal case thereby traveling in the light conductor plate 18 without becoming visible as a high illumination light to cause a non-uniform brightness, and are diffused by a light diffusing pattern of the light conductor plate 18 thus exiting as an effective illumination light from a light outlet surface of the light conductor plate 18.

Further, the spread illuminating apparatus 1A obtains the effect that the spread illuminating apparatus 1 of the first embodiment achieves through the featured structure of the light reflector plate 15 as described earlier. Specifically, the occurrence of a hot spot is inhibited, and at the same time the brightness at the display area can be enhanced.

What is claimed is:

1. A spread illuminating apparatus comprising:
   a light conductor plate having a light inlet surface and a light outlet surface;
   at least one point light source disposed along the light inlet surface of the light conductor plate;
   a light reflector plate disposed on a major surface of the light conductor plate opposite to the light outlet surface, wherein an end of the light reflector plate located adjacent to the point light source extends beyond the light inlet surface in a direction toward the point light source; and
   a light absorbing region disposed so as to cover at least a portion of the point light source,
   wherein the light absorbing region comprises:
      a light absorbing member disposed on a surface of the light reflector plate opposite to a surface facing the light conductor plate; and
      a recess provided between the light absorbing member and the point light source.

2. A spread illuminating apparatus according to claim 1 wherein the recess of the light reflector plate has a substantially semicircular shape.

3. A spread illuminating apparatus according to claim 2, further comprising a light diffuser sheet disposed on the light outlet surface of the light conductor plate, wherein an end of the light diffuser sheet located on a side of the point light source extends beyond the light inlet surface in a direction toward the point light source.

4. A spread illuminating apparatus according to claim 3, wherein the light diffuser sheet comprises a notched portion disposed on a side of the point light source opposite to a side facing the notched portion, wherein a tip of the notched portion is positioned at the light outlet surface of the light conductor plate.

* * * * *